US006794669B2

(12) United States Patent
Chelvayohan et al.

(10) Patent No.: US 6,794,669 B2
(45) Date of Patent: Sep. 21, 2004

(54) MEDIA SENSING APPARATUS FOR DETECTING AN ABSENCE OF PRINT MEDIA

(75) Inventors: Mahesan Chelvayohan, Lexington, KY (US); Herman Anthony Smith, Winchester, KY (US); Charles Jarrett Simpson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 34 days.

(21) Appl. No.: 10/202,133

(22) Filed: Jul. 24, 2002

(65) Prior Publication Data

US 2004/0017416 A1 Jan. 29, 2004

(51) Int. Cl.[7] .................................................. G01N 21/86
(52) U.S. Cl. ................................ 250/559.4; 250/559.16
(58) Field of Search ......................... 250/559.19, 559.4, 250/559.16; 356/446

(56) References Cited

U.S. PATENT DOCUMENTS

| | | | |
|---|---|---|---|
| 1,917,379 | A | 7/1933 | Lowry |
| 3,792,268 | A | 2/1974 | Bjerke et al. |
| 3,892,492 | A | 7/1975 | Eichenberger |
| 4,525,630 | A | 6/1985 | Chapman |
| 4,540,887 | A | 9/1985 | Minerd et al. |
| 4,613,235 | A | 9/1986 | Suga |
| 4,636,633 | A | 1/1987 | Roger et al. |
| 4,778,296 | A | 10/1988 | Takahashi |
| 4,793,605 | A | 12/1988 | Tajima |
| 4,945,253 | A | 7/1990 | Frohardt |
| 4,950,905 | A | 8/1990 | Butler et al. |
| 4,954,846 | A | 9/1990 | Matsuo et al. |
| 4,983,854 | A | 1/1991 | Mizuno et al. |
| 4,989,985 | A | 2/1991 | Hubble, III et al. |
| 5,084,627 | A | 1/1992 | Ueki et al. |
| 5,109,236 | A | 4/1992 | Watanabe et al. |
| 5,139,339 | A | 8/1992 | Courtney et al. |
| 5,230,573 | A | 7/1993 | Yasuoka et al. |
| 5,250,813 | A | 10/1993 | Takahashi et al. |
| 5,262,637 | A | 11/1993 | Cumberledge et al. |
| 5,401,977 | A | 3/1995 | Schwarz |
| 5,414,269 | A | 5/1995 | Takahashi |
| 5,552,890 | A | 9/1996 | Nanna et al. |
| 5,748,221 | A | 5/1998 | Castelli et al. |
| 5,751,443 | A | 5/1998 | Borton et al. |
| 5,764,251 | A | 6/1998 | Hashimoto |
| 5,828,924 | A | 10/1998 | Fukada et al. |
| 5,844,682 | A | 12/1998 | Kiyomoto et al. |
| 5,925,889 | A | 7/1999 | Guillory et al. |
| 5,974,160 | A | 10/1999 | Shiratori et al. |
| 6,006,668 | A | 12/1999 | Rehmann |
| 6,018,164 | A | 1/2000 | Mullens |
| 6,140,662 | A | 10/2000 | Lim et al. |
| 6,215,552 | B1 | 4/2001 | Acquaviva et al. |
| 6,291,829 | B1 | 9/2001 | Allen et al. |
| 6,325,505 | B1 | 12/2001 | Walker |

FOREIGN PATENT DOCUMENTS

JP 07-304214 A * 11/1995

* cited by examiner

*Primary Examiner*—Thanh X. Luu
(74) *Attorney, Agent, or Firm*—Taylor & Aust, P.C.

(57) ABSTRACT

A media sensing apparatus includes a media sensor including a light source for generating a light beam, and a diffuse detector positioned in relation to the light source for detecting diffuse light components reflected from a sheet of print media. A media support is provided having a detection portion. The detection portion is located such that the media sensor faces the detection portion. The detection portion is configured to direct specular light components reflected from the detection portion to the diffuse detector in an absence of the sheet of print media being interposed between the media sensor and the detection portion.

15 Claims, 6 Drawing Sheets

MEDIA SENSING APPARATUS FOR DETECTING AN ABSENCE OF PRINT MEDIA

BACKGROUND OF THE INVENTION

1. Field of the Invention

The present invention relates to media sensors, and, more particularly, to a method for detecting an absence of print media.

2. Description of the Related Art

One form of a media sensor includes a single light source, such as a light emitting diode (LED), and a light detector, such as a phototransistor. Typically, the light detector is located on the same side of a print media as the light source. During operation, the LED directs light at a predefined angle onto a material surface of the print media, and the surface characteristics of the print media are examined in terms of the amount of light reflected from the surface that is received by the light detector. The presence of the print media is detected based upon a predetermined amount of light reflected from the media to the light detector.

Some media sensors include a pair of light detectors, one of the light detectors being positioned to sense reflected diffuse light and a second detector positioned to sense reflected specular light. Such a sensor may be used, for example, to detect and discriminate between paper media and transparency media.

Media sensors that are used to detect the type of media in an imaging device, such as an ink jet printer, optically measure the glossiness of the media using a media sensor similar to that described generally above. To measure the glossiness, a collimated beam of light is directed towards the media and a reflectance ratio (R) of the detected reflected specular light intensity and the detected diffusively scattered light intensity is calculated. The media sensor is initially calibrated by measuring a reflectance ratio (R0) on a known gloss media. A normalized reflectance ratio (Rn) is calculated using the formula: Rn=(R/R0). Normalized reflectance ratio Rn then is used to identify the media type of an unknown media by a comparison of the normalized reflectance ratio Rn to a plurality of normalized reflectance ratio Rn ranges, each range being associated with a particular type of media. For example, if the media sensor is calibrated with a perfectly diffuse media, then the normalized reflectance ratio Rn ranges might be as in the following table.

TABLE 1

Media Determination Based on Normalized Reflectance Ratio Rn

| Rn Range | Media Type |
|---|---|
| Rn < 1.5 | Coated Paper |
| 1.5 ≦ Rn < 3 | Plain Paper |
| 3 ≦ Rn < 10 | Photo Paper |
| 10 ≦ Rn | Transparency |

In one prior system designed to determine the print media type, it is possible to detect an empty paper tray by reflecting both specular and diffuse light components away from the sensor. However, such a design may be unreliable since the amount of detected light will be very small, similar to when a media sensor fails.

What is needed in the art is an improved media sensing apparatus that can detect the absence of print media reliably.

SUMMARY OF THE INVENTION

The present invention relates to an improved media sensing apparatus that can detect the absence of print media.

In one form thereof, the present invention is directed to a media sensing apparatus. The media sensing apparatus includes a media sensor including a light source for generating a light beam, and a diffuse detector positioned in relation to the light source for detecting diffuse light components reflected from a sheet of print media. A media support is provided having a detection portion. The detection portion is located such that the media sensor faces the detection portion. The detection portion is configured to direct specular light components reflected from the detection portion to the diffuse detector in an absence of the sheet of print media being interposed between the media sensor and the detection portion.

An advantage of the present invention is that it can be implemented relatively easily in any imaging device using a simple sensor that senses print media type.

Another advantage of the present invention is that the same sensor used to determine media type can be used to detect the absence of print media.

Another advantage is that the present invention can be implemented with little additional hardware costs in an imaging device having a preexisting sensor that senses the print media type.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
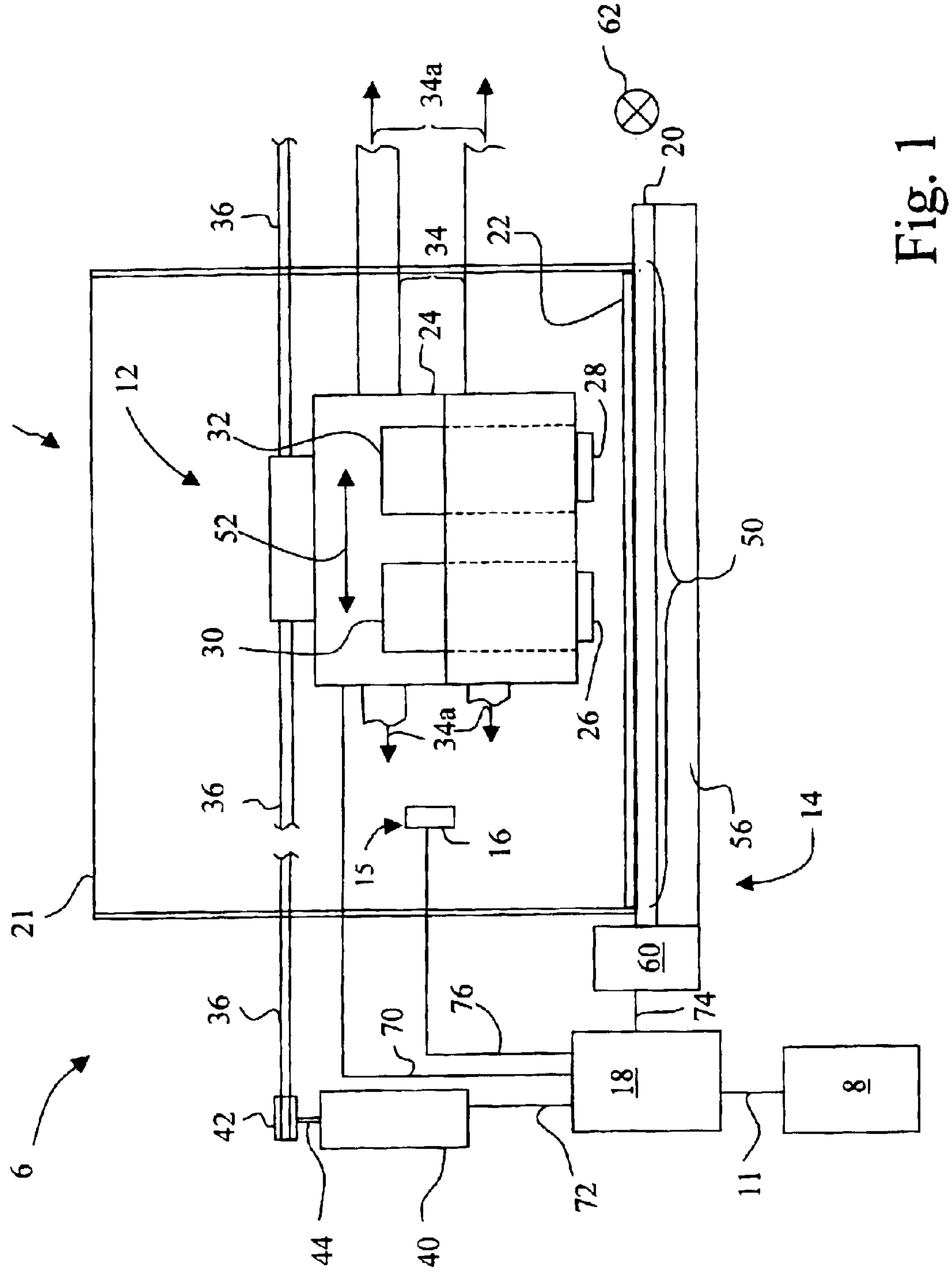
FIG. 1 is a diagrammatic representation of an imaging system embodying the present invention.
Figure 2:
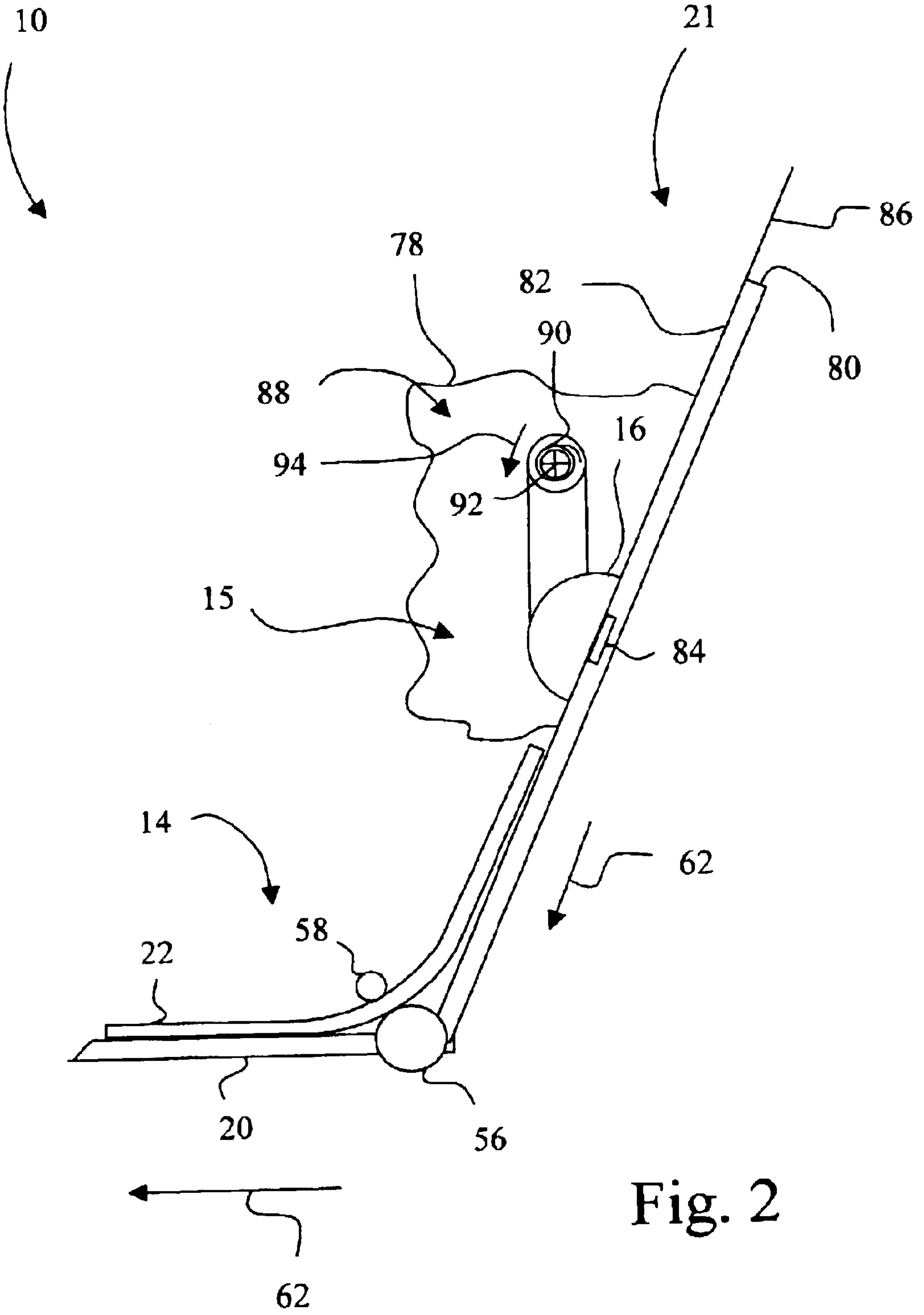
FIG. 2 is a side diagrammatic representation of a portion of the ink jet printer of the imaging system of FIG. 1.

Referring now to the drawings, and particularly to FIGS. 1 and 2, there is shown an imaging system 6 embodying the present invention. Imaging system 6 includes a computer 8 and an imaging device in the form of an ink jet printer 10.

Computer 8 is communicatively coupled to ink jet printer 10 via a communications link 11. Communications link 11 may be, for example, a direct electrical or optical connection, or a network connection.

Computer 8 is typical of that known in the art, and includes a display, an input device, e.g., a keyboard, a processor, and associated memory. Resident in the memory of computer 8 is printer driver software. The printer driver software places print data and print commands in a format that can be recognized by ink jet printer 10. The format can be, for example, a data packet including print data and printing commands for a given area, such as a print swath, and including a print header that identifies the swath data.

Ink jet printer 10 includes a printhead carrier system 12, a feed roller unit 14, a media sensing apparatus 15 including a media sensor 16, a controller 18, a mid-frame 20 and a media source 21.

Media source 21 is configured and arranged to supply individual sheets of print media 22 to feed roller unit 14, which in turn further transports the sheets of print media 22 during a printing operation.

Printhead carrier system 12 includes a printhead carrier 24 for carrying a color printhead 26 and a black printhead 28. A color ink reservoir 30 is provided in fluid communication with color printhead 26, and a black ink reservoir 32 is provided in fluid communication with black printhead 28. Printhead carrier system 12 and printheads 26, 28 may be configured for unidirectional printing or bi-directional printing.

Printhead carrier 24 is guided by a pair of guide rods 34. The axes 34*a* of guide rods 34 define a bi-directional scanning path for printhead carrier 24, and thus, for convenience the bi-directional scanning path will be referred to as bi-directional scanning path 34*a*. Printhead carrier 24 is connected to a carrier transport belt 36 that is driven by a carrier motor 40 via driven pulley 42. Carrier motor 40 has a rotating carrier motor shaft 44 that is attached to carrier pulley 42. At the directive of controller 18, printhead carrier 24 is transported in a reciprocating manner along guide rods 34. Carrier motor 40 can be, for example, a direct current (DC) motor or a stepper motor.

The reciprocation of printhead carrier 24 transports ink jet printheads 26, 28 across the sheet of print media 22, such as paper, along bi-directional scanning path 34*a* to define a print zone 50 of printer 10. This reciprocation occurs in a main scan direction 52 that is parallel with bi-directional scanning path 34*a*, and is also commonly referred to as the horizontal direction. During each scan of printhead carrier 24, the sheet of print media 22 is held stationary by feed roller unit 14.

Referring to FIG. 2, feed roller unit 14 includes an index roller 56 and corresponding index pinch rollers 58. Index roller 56 is driven by a drive unit 60 (FIG. 1). Index pinch rollers 58 apply a biasing force to hold the sheet of print media 22 in contact with respective driven index roller 56. Drive unit 60 includes a drive source, such as a stepper motor, and an associated drive mechanism, such as a gear train or belt/pulley arrangement. Feed roller unit 14 feeds the sheet of print media 22 in a sheet feed direction 62 (see FIGS. 1 and 2).

Controller 18 is electrically connected to printheads 26 and 28 via a printhead interface cable 70. Controller 18 is electrically connected to carrier motor 40 via an interface cable 72. Controller 18 is electrically connected to drive unit 60 via an interface cable 74. Controller 18 is electrically connected to media sensor 16 via an interface cable 76.

Controller 18 includes a microprocessor having an associated random access memory (RAM) and read only memory (ROM). Controller 18 executes program instructions to effect the printing of an image on the sheet of print media 22, such as coated paper, plain paper, photo paper and transparency. In addition, controller 18 executes instructions to conduct media sensing, and for detecting the absence of print media, based on information received from media sensor 16.

Referring to FIG. 2, media source 21 is attached, at least in part, to a frame 78 of ink jet printer 10. Media source 21 includes a media support 80 including a media support surface 82. A detection portion 84 of media support 80 is adjacent to media support surface 82. Detection portion 84 may, for example, be molded with media support 80. Detection portion 84 is a part of media sensing apparatus 15. Detection portion 84 is located to be proximate to and opposite to media sensor 16. In the embodiments of the present invention of FIGS. 2, 4 and 5, for example, detection portion 84 defines at least one angled surface that is non-parallel to a plane 86 of media support surface 82. As print media 22 is loaded in media support 80, print media 22 is interposed between detection portion 84 of media support 80 and media sensor 16.

Media sensor 16 is mounted to frame 78 via a pivot arm arrangement 88 that is biased by a spring 90 to pivot about axis 92 in the direction indicated by arrow 94. In an alternative arrangement, pivot arm arrangement 88 may be biased simply by the forces of gravity. If no stops are provided on pivot arm arrangement 88, when no sheet of media is present between detection portion 84 of media support 80 and media sensor 16, media sensor 16 will contact media support surface 82 of media support 80 (see FIG. 4). Alternatively, however, a guide roller (not shown) may be installed to limit the pivoting of pivot arm arrangement 88 such that media sensor 16 is maintained at a predefined distance from the sensing surface, for example, from the sheet of print media 22 or from detection portion 84 of media support 80 (see FIG. 5). Such a predefined distance may be, for example, one millimeter.

Figure 3:
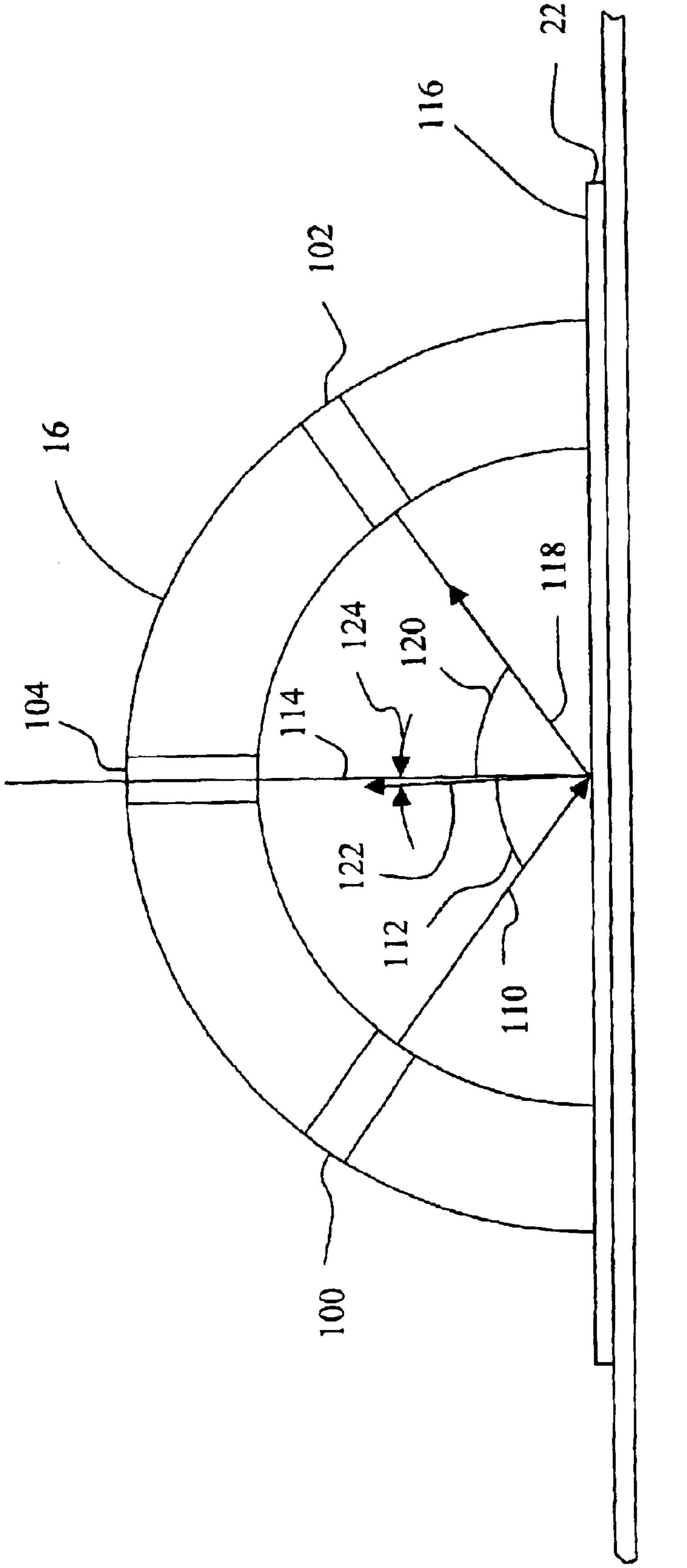
Fig. 3 PRIOR ART
FIG. 3 is a side diagrammatic representation of a media sensor known in the art.

Referring to FIG. 3, media sensor 16 may be, for example, a unitary optical sensor including a light source 100, a specular detector 102 and a diffuse detector 104, as is well known in the art. In its simplest form, light source 100 may include, for example, light emitting diode (LED). In a more complex form, light source 100 may further include additional optical components for generating a collimated light beam, such as light beam 110. Each of specular detector 102 and a diffuse detector 104 can be, for example, a phototransistor.

As shown in FIG. 3, specular detector 102 and diffuse detector 104 are located to be on the same side of the sheet of print media 22. Also, media sensor 16 is configured such that diffuse detector 104 is positioned between light source 100 and specular detector 102. The operation of such sensors is well known in the art, and thus, will only briefly be discussed herein. For example, light source 100 of media sensor 16 directs light beam 110 at a predefined angle 112 with respect to a normal line 114 onto a material surface 116 of the sheet of print media 22, and specular light component 118 reflected from material surface 116 at an angle 120 from normal line 114 is received by specular detector 102, and a diffuse light component 122 of the light, such as that reflected at an angle 124, for example approximately 1.0 degree from normal line 114, is received by diffuse detector 104. From the received amount of reflected light, a reflectance ratio R of the detected reflected specular light intensity and the detected diffusively scattered light intensity can be calculated. A normalized reflectance ratio Rn can be calculated as R divided by R0, wherein R0 is a reflectance ratio of a reference material. A media type can then be determined by comparison of Rn to ranges of predetermined normalized reflectance ratio thresholds corresponding to certain media types (see, for example, Table 1 above).

In the absence of the present invention, as in the prior art arrangement of FIG. 3, it is difficult to accurately detect the absence of print media 22 in a media tray, since the surface characteristics of the media support surface of the media tray can closely approximate the reflectivity of a certain type of media. For example, if the media support surface is glossy, it is possible that a normalized reflectance ratio Rn of 11.0 could be determined, thereby indicating that a sheet of transparency was located in the media tray when in fact the media tray is empty. As a further example, if the media support surface has a matte finish, it is possible that a normalized reflectance ratio Rn of 1.2 could be determined, thereby indicating that a sheet of coated paper was located in the media tray when in fact the media tray is empty. In either of the examples above, a false indication of print media being present is ascertained.

Figure 4:
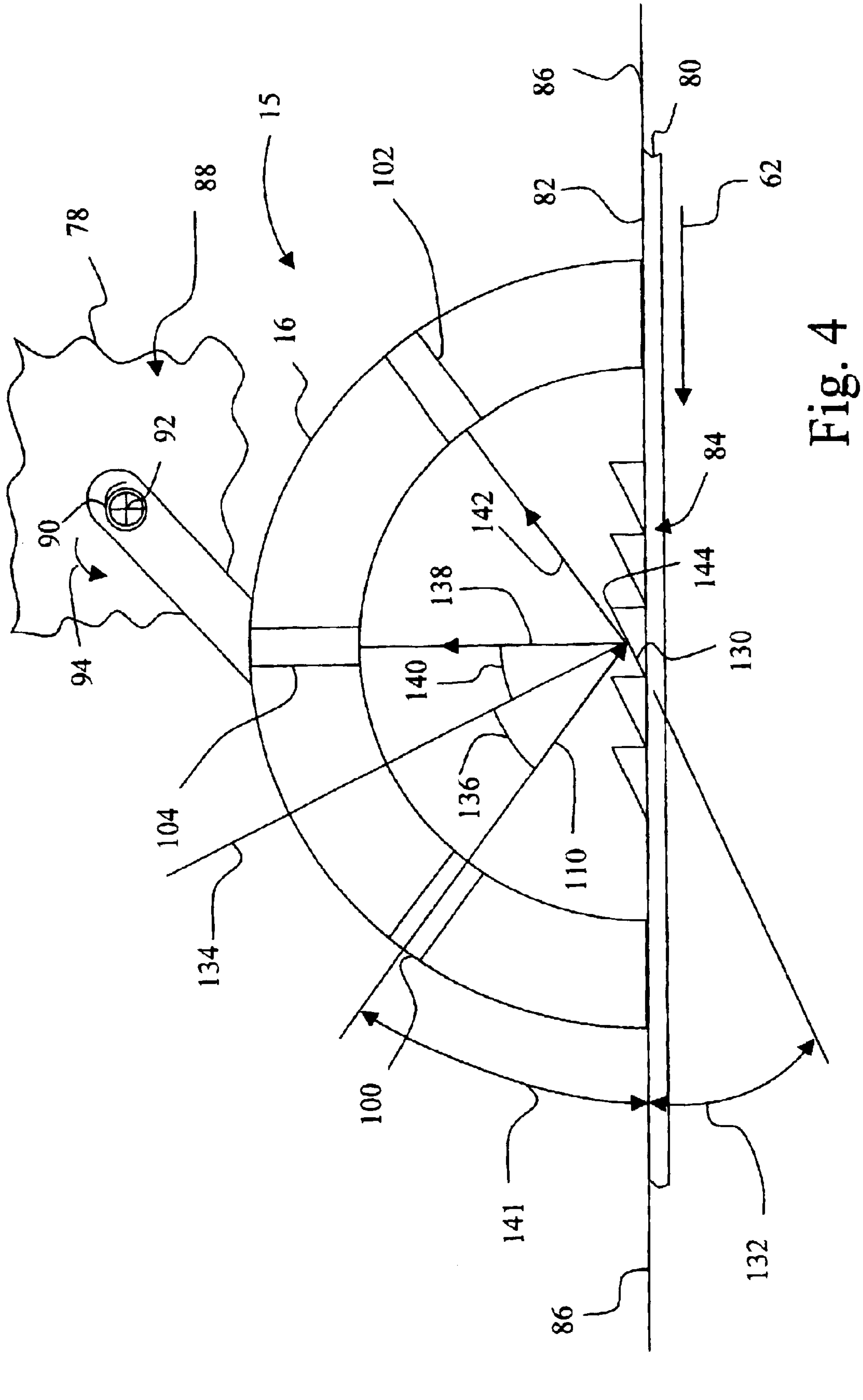
FIG. 4 is a first embodiment of a media sensing apparatus embodying the present invention.
Figure 5:
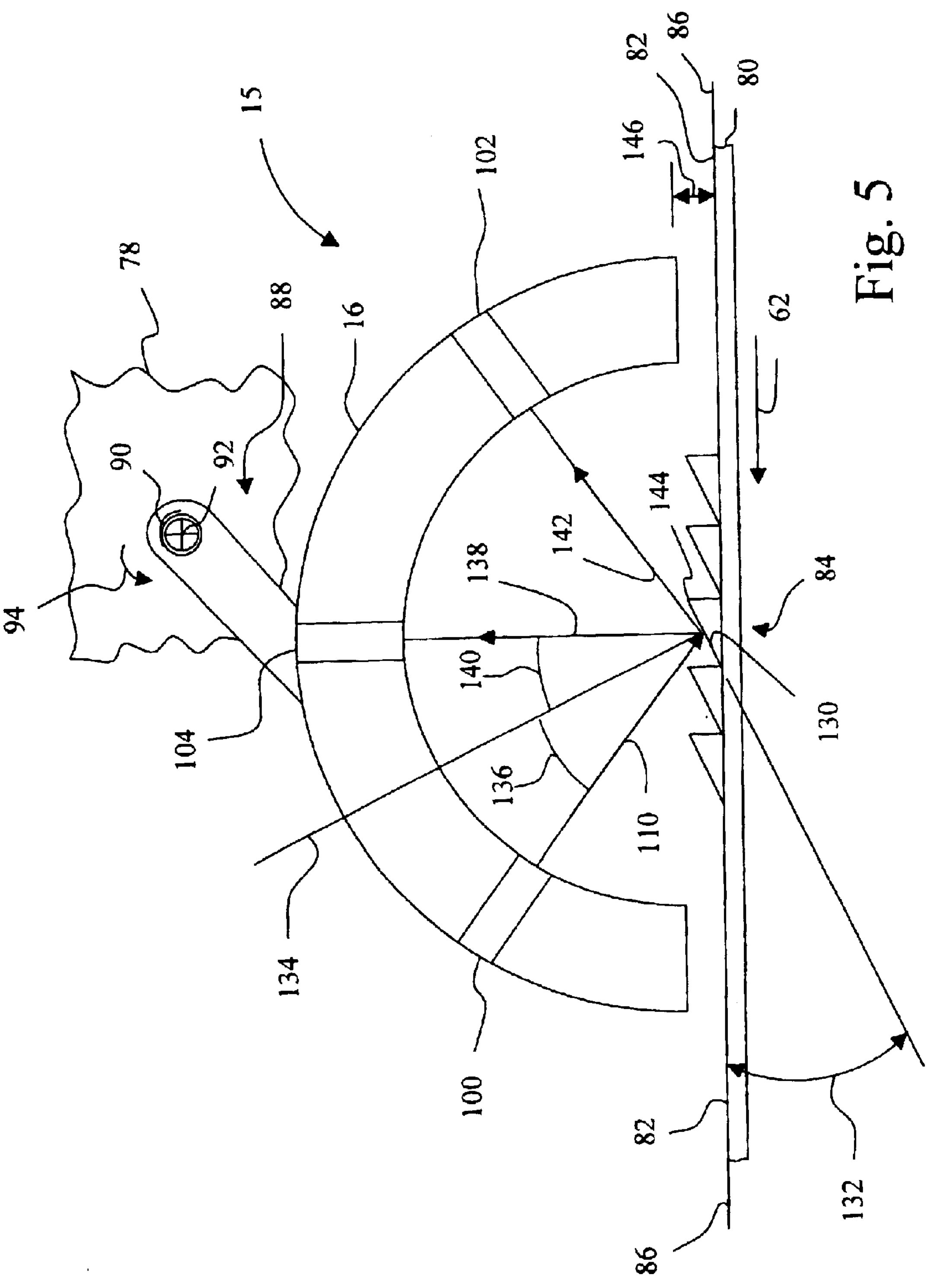
FIG. 5 is another embodiment of a media sensing apparatus embodying the present invention.

To solve this problem, referring for example to the embodiments of the present invention of FIGS. 4 and 5, a detection portion 84 of media support 80 is located adjacent to media support surface 82 and opposite to media sensor 16. Detection portion 84 is configured to cause specular light components to be directed to diffuse detector 104 in the absence of print media 22 being interposed between media sensor 16 and detection portion 84, and at least some of the diffuse light components will be received by specular detector 102. In contrast, when a sheet of print media 22 is present between media sensor 16 and detection portion 84, specular light components reflected from the sheet of print media 22 are directed to specular detector 102 and at least some of the diffuse light components reflected from the sheet of print media 22 are directed to diffuse detector 104, in the manner similar to that described above with respect to FIG. 3. With the configuration of the present invention, a normalized reflectance ratio Rn is calculated by controller 18, and the normalized reflectance ratio Rn, which is based on the reflectivity characteristics of detection portion 84, will be lower than the most diffuse media type that is to be detected, such as for example, coated paper. Such a normalized reflectance ratio may be, for example, in the range of about 0.01 to about 1.0, and more preferably, in a range of 0.01 to 0.5 when media sensor 16 is normalized to a perfectly diffuse reference media. Thus, the lower threshold for coated paper will be selected to be higher than the normalized reflectance ratio range attributable to detection portion 84, and yet will be low enough to correctly classify the coated paper, such as that shown in the example of Table 2 below.

TABLE 2

Media Determination Based on Normalized Reflectance Ratio Rn

| Rn Range | Media Type |
|---|---|
| $0 < Rn < 1.0$ | Media Absent |
| $1.0 \leqq Rn < 1.5$ | Coated Paper |
| $1.5 \leqq Rn < 3$ | Plain Paper |
| $3 \leqq Rn \leqq 10$ | Photo Paper |
| $10 \leqq Rn$ | Transparency |

Notwithstanding the values for normalized reflectance ratio Rn in Table 2, with the present invention it is possible to attain an actual Media Absent normalized reflectance ratio Rn range of, for example, 0.01 to 0.2 when surface 130 is high glossy.

In the embodiment of FIG. 4, media sensor 16 is positioned proximate to and facing detection portion 84 of media support 80. Pivot arm arrangement 88 is biased by spring 90 to pivot about axis 92 in the direction indicated by arrow 94 such that, when no sheet of media is present between detection portion 84 of media support 80 and media sensor 16, media sensor 16 will contact media support surface 82 of media support 80.

Detection portion 84 includes an angled surface 130 that extends in a direction non-parallel to plane 86 of media support 80 at an angle 132. Angled surface 130 may have, for example, a high gloss finish, similar to the surface characteristics of a transparency. The size and extent of angled surface 130 is greatly exaggerated in FIG. 4 so that the details of the angular relationship of the various components can be seen more clearly. As is apparent in FIG. 4, plane 86 extends across detection portion 84. Angle 132 is selected such that angled surface 130 defines a normal line 134 perpendicular to angled surface 130 that bisects the region between light source 100 and diffuse detector 104. Light beam 110 contacts angled surface 130 at an angle of incidence 136 measured from normal line 134, and specular light components 138 are reflected at an angle 140 measured from normal line 134 and directed to diffuse detector 104. Angle 140 is substantially equal to angle 136.

From FIG. 4, it can be seen that the direction of light beam 110 is at an angle 141 with respect to plane 86 of media support surface 82. Accordingly, angle 132 can be calculated based on the equation: Angle 132=90−((Σ angles 136, 140, 141)+angle 141)/2. If, for example, the sum of angles 136, 140 and 141 is equal to 90 degrees, and angle 141 is 25 degrees, than angle 132 is 32.5 degrees.

As can be observed from the configuration of FIG. 4, specular light components 138 will be directed to diffuse detector 104, and a small amount of diffuse light components, such as diffuse light components 142, will be received by specular detector 102. However, controller 18 processes the signals received from diffuse detector 104 and the signals received from specular detector 102 using the same reflectance ratio equation that is used in media type determination. More particularly, the reflectance ratio R is the ratio of the signal provided by specular detector 102 divided by the signal provided by diffuse detector 104. This reflectance ratio R can then be normalized with reference to a calibrating reflectance ratio R0, such that the normalized reflectance ratio Rn is equal to R divided by R0. Thus, when controller 18 calculates the normalized reflectance ratio Rn in the absence of print media, an extremely low Rn value will be calculated. For example, when controller 18 calculates a reflectance ratio of signals corresponding to diffuse light components 142 and signals corresponding to specular light components 138 from detection portion 84 as detected by specular detector 102 and diffuse detector 104, respectively, of media sensor 16, in the absence of a sheet of print media 22, a low normalized reflectance ratio in a range, for example, of 0.01 to 0.5 can be determined.

As shown in the embodiment of FIG. 4, detection portion 84 includes a plurality of angled surfaces, i.e., a plurality of facets, each extending at an angle in a direction non-parallel to plane 86 of media support 80 at angle 132. The size of the plurality of angled surfaces, such as angled surface 130, is greatly exaggerated in FIG. 4 so that the details of the angular relationship of the various components can be seen more clearly. The plurality of angled surfaces may be populated across detection portion 84 at, for example, at a rate of about 25 to about 50 angled surfaces per inch (about 10 to about 20 angled surface per centimeter). By providing a plurality of angled surfaces like that of angled surface 130, the exact positioning of media sensor 16 with respect to detection portion 84 is less critical, since shifting media sensor 16 along plane 86 will simply move the location of impingement of light beam 110 with detection portion 84 from one angled surface to another without affecting the operation of media sensor apparatus 15. Also, when an angled surface 130 is smaller than the beam width of light beam 110, then the light will be simultaneously reflected from multiple facets, i.e., multiple angled surfaces 130, of detection portion 84. The actual number of angled surfaces per unit distance can be selected based on machining tolerances to provide as many facets as possible, while preserving a sharp cut off at the distal ends, i.e., the points 144 of the angled surfaces, such as angled surface 130. It is contemplated that alternatively angled surfaces 130 may be located such that the points 144 are positioned at or below media support surface 82.

The embodiment of FIG. 5 differs from that of FIG. 4 in that a gap 146 is formed between media sensor 16 and media support surface 82 so as to space media sensor 16 from media support surface 82, even in the absence of a sheet of print media between media sensor 16 and media support surface 82. The operation of the embodiment of FIG. 5 remains substantially the same as that of the embodiment of FIG. 4, since the geometry of light reflections remain the same.

Figure 6:
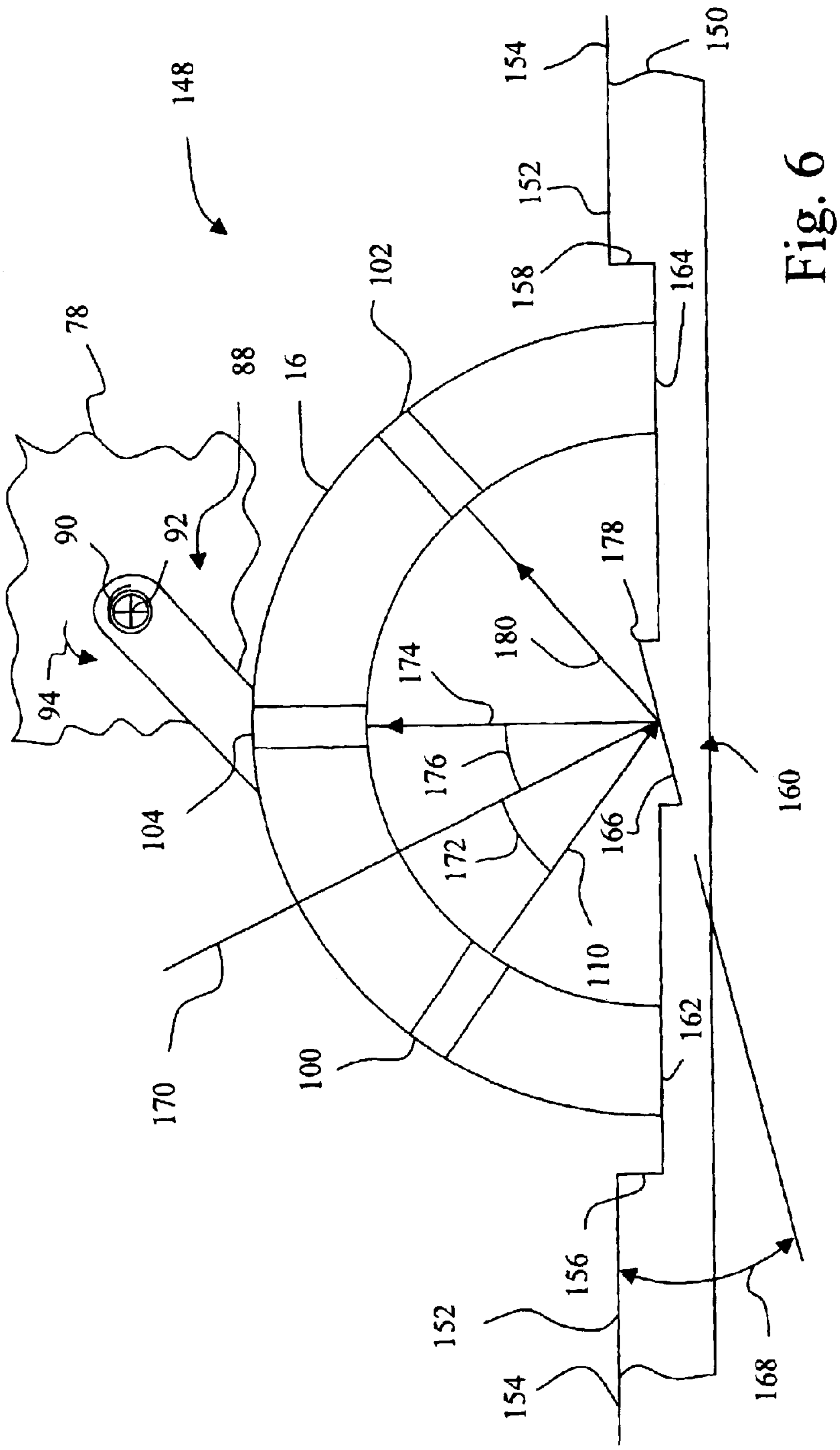
FIG. 6 is another embodiment of a media sensing apparatus embodying the present invention.

FIG. 6 shows another media sensor apparatus 148 embodying the present invention having a media support 150 that can replace the media support 80 of FIGS. 1, 2, 4 and 5. Media support 150 has a media support surface 152 that extends along a plane 154. Media support 150 further includes a first recessed portion 156, a second recessed portion 158 and a detection portion 160. Detection portion 160 is positioned between first recessed portion 156 and second recessed portion 158. First recessed portion 156 defines a first recessed surface 162, and second recessed portion 158 defines a second recessed surface 164.

Media sensor 16 is positioned proximate to and facing detection portion 160 of media support 150, and pivot arm arrangement 88 is biased by spring 90 to pivot about axis 92 in the direction indicated by arrow 94 such that, when no sheet of media is present between detection portion 160 of media support 150 and media sensor 16, media sensor 16 will contact recessed surfaces 162 and 164 of media support 150. Recessed surfaces 162 and 164 provide support for media sensor 16 below plane 154 of media support 150.

Detection portion 160 includes an angled surface 166 that extends in a direction non-parallel to plane 154 of media support 150 at an angle 168. As is apparent in FIG. 6, plane 154 extends across detection portion 160. Angle 168 is selected such that angled surface 166 defines a normal line 170 that bisects the region between light source 100 and diffuse detector 104. Light beam 110 contacts angled surface 130 at an angle of incidence 172 measured from normal line 170, and specular light components 174 are reflected at an angle 176 measured from normal line 170 and directed to diffuse detector 104. Angle 176 is substantially equal to angle 172. In the detection portion configuration of FIG. 6, a distal point 178 of angled surface 166 of detection portion 160 is at, or alternatively below, plane 154 of media support 150. Thus, in this arrangement, the sheet of print media 22 will not be elevated above plane 154 of media support 150 when the sheet of print media 22 is present between media sensor 16 and detection portion 160 of media support 150.

As can be observed from FIG. 6, in the absence of the sheet of print media 22, specular light components 174 will be directed to diffuse detector 104, and small amount of diffuse light components, such as diffuse light components 180, will be received by specular detector 102. As such, when controller 18 calculates the normalized reflectance ratio Rn in the absence of print media, as described above, an extremely low Rn value will be calculated, since controller 18 considers the signals received from diffuse detector 104 to be representative of the detected diffuse light components for purposes of the calculation. For example, when controller 18 calculates a reflectance ratio of signals corresponding to diffuse light components 180 and specular light components 174 as detected by specular detector 102 and diffuse detector 104, respectively, of media sensor 16, in the absence of a sheet of print media 22, a normalized reflectance ratio lower than that of coated media, in a range of 0.01 to 0.5, can be determined.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A media sensing apparatus, comprising:

a media sensor including a light source for generating a light beam, and a diffuse detector positioned in relation to said light source for detecting diffuse light components reflected from a sheet of print media; and a media support having a detection portion, said media sensor being variably spaced from said media support, said detection portion being located such that said media sensor faces said detection portion, said detection portion being configured to direct specular light components reflected from said detection portion to said diffuse detector in an absence of said sheet of print media being interposed between said media sensor and said detection portion.

2. The media sensing apparatus of claim 1, said media sensing apparatus being incorporated into an imaging device.

3. The media sensing apparatus of claim 1, wherein said detection portion comprises an angled surface that extends at an angle non-parallel to a plane of said media support.

4. The media sensing apparatus of claim 3, wherein said plane extends along a surface of said media support and across said detection portion.

5. The media sensing apparatus of claim 3, wherein said light beam contacts said angled surface at a first angle measured from a normal line of said angled surface and said specular light components are reflected at a second angle measured from said normal line, said second angle being substantially equal to said first angle.

6. The media sensing apparatus of claim 1, wherein said detection portion comprises a plurality of angled surfaces, wherein at least a portion of said plurality of angled surfaces extend at an angle non-parallel to a plane of a surface of said media support.

7. The media sensing apparatus of claim 1, wherein said media support includes a first recessed portion and a second recessed portion, said detection portion being positioned between said first recessed portion and said second recessed portion.

8. A media sensing apparatus, comprising:

a media sensor including a light source for generating a light beam, and a diffuse detector positioned in relation to said light source for detecting diffuse light components reflected from a sheet of print media; and a media support having a detection portion, said media sensor being variably spaced from said media support, said detection portion being located such that said media sensor faces said detection portion, said detection portion being configured to direct specular light components reflected from said detection portion to said diffuse detector in an absence of said sheet of print media being interposed between said media sensor and said detection portion, said media support including a first recessed portion and a second recessed portion, said detection portion being positioned between said first recessed portion and said second recessed portion, wherein said media sensor is configured to contact at least one of a first recessed surface defined by said first recessed portion and a second recessed surface defined by said second recessed portion in the absence of said sheet of print media.

9. The media sensing apparatus of claim 7, wherein each of said first recessed portion and said second recessed portion define a respective recessed surface located below a plane of a media support surface of said media support.

10. The media sensing apparatus of claim 1, wherein said media sensor is configured to be spaced from said media support even in the absence of said sheet of print media.

11. A media sensing apparatus, comprising:

a media sensor including a light source for generating a light beam, and a diffuse detector positioned in relation to said light source for detecting diffuse light components reflected from a sheet of print media;

a media support having a detection portion, said detection portion being located such that said media sensor faces said detection portion, said detection portion being configured to direct specular light components reflected from said detection portion to said diffuse detector in an absence of said sheet of print media being interposed between said media sensor and said detection portion;

a specular detector located in said media sensor and positioned in relation to said light source for detecting specular light components reflected from said sheet of print media, said detection portion being configured to cause at least some diffuse light components reflected from said detection portion to be received by said specular detector in the absence of said sheet of print media; and a controller for calculating a normalized reflectance ratio of said specular light components detected by said diffuse detector and said diffuse light components detected by said specular detector, wherein in the absence of said sheet of print media, said normalized reflectance ratio is lower than that of coated paper.

12. The media sensing apparatus of claim 11, said media sensor being normalized to a perfectly diffuse media, wherein in the absence of said sheet of print media, said normalized reflectance ratio is in a range of 0.01 to 0.5.

13. A media sensing apparatus, comprising:

a media sensor including a light source for generating a light beam, and a diffuse detector positioned in relation to said light source for detecting diffuse light components reflected from a sheet of print media; and a media support having a detection portion, said media sensor being variably spaced from said media support, said detection portion being located such that said media sensor faces said detection portion, said detection portion being configured to direct specular light components reflected from said detection portion to said diffuse detector in an absence of said sheet of print media being interposed between said media sensor and said detection portion, and said detection portion comprising a plurality of angled surfaces, wherein at least a portion of said plurality of angled surfaces extend at an angle non-parallel to a plane of a surface of said media support, wherein said plurality of angled surfaces are populated at a rate in a range of about 10 to about 20 angled surfaces per centimeter.

14. A media sensing apparatus, comprising:

a media sensor including a light source for generating a light beam, and a diffuse detector positioned in relation to said light source for detecting diffuse light components reflected from a sheet of print media; and a media support having a detection portion, said media sensor being variably spaced from said media support, said detection portion being located such that said media sensor faces said detection portion, said detection portion being configured to direct specular light components reflected from said detection portion to said diffuse detector in an absence of said sheet of print media being interposed between said media sensor and said detection portion, wherein said media sensor is configured to contact said media support in the absence of said sheet of print media.

15. A media sensing apparatus, comprising:

a media sensor including a light source for generating a light beam, and a diffuse detector positioned in relation to said light source for detecting diffuse light components reflected from a sheet of print media;

a media support having a detection portion, said detection portion being located such that said media sensor faces said detection portion, said detection portion being configured to direct specular light components reflected from said detection portion to said diffuse detector in an absence of said sheet of print media being interposed between said media sensor and said detection portion;

a specular detector located in said media sensor and positioned in relation to said light source for detecting specular light components reflected from said sheet of print media, said detection portion being configured to cause at least some diffuse light components reflected from said detection portion to be received by said specular detector in the absence of said sheet of print media; and a controller for calculating a normalized reflectance ratio of said specular light components detected by said diffuse detector and said diffuse light components detected by said specular detector in order to determine said absence of said sheet of print media.

* * * * *